Feb. 16, 1965  J. D. LANGWELL  3,169,307
TOOLS FOR HANDLING SPLIT RETAINING RINGS
Filed Nov. 1, 1962  5 Sheets-Sheet 1

INVENTOR
JOHN D. LANGWELL
BY
ATTORNEY

INVENTOR.
JOHN D. LANGWELL

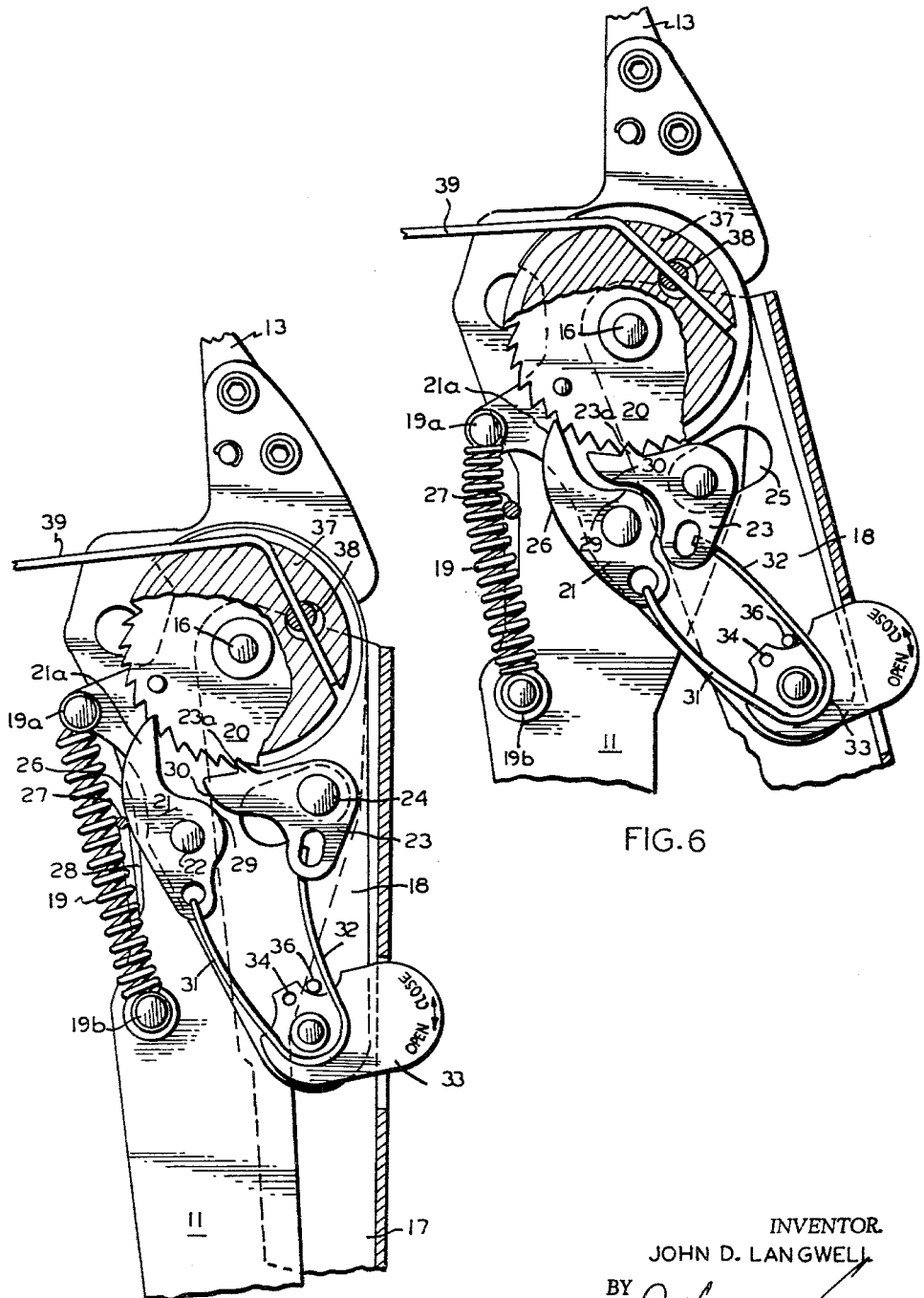

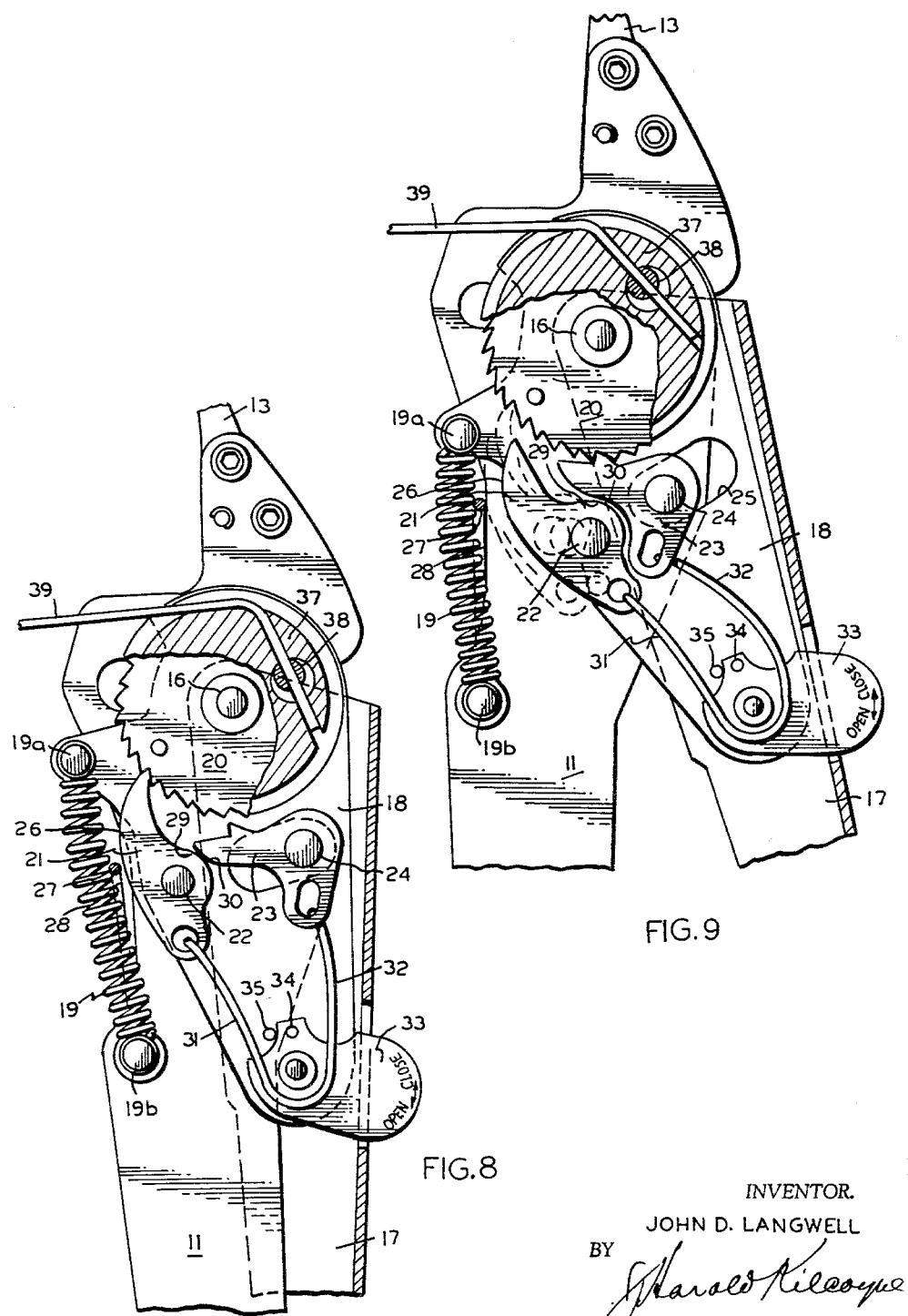

Feb. 16, 1965  J. D. LANGWELL  3,169,307
TOOLS FOR HANDLING SPLIT RETAINING RINGS
Filed Nov. 1, 1962  5 Sheets-Sheet 5

INVENTOR.
JOHN D. LANGWELL
BY
J. Harold Kilcoyne
ATTORNEY

United States Patent Office 3,169,307
Patented Feb. 16, 1965

3,169,307
TOOLS FOR HANDLING SPLIT RETAINING RINGS
John D. Langwell, Freeport, N.Y., assignor to Waldes
Kohinoor, Inc., Long Island City, N.Y., a corporation
of New York
Filed Nov. 1, 1962, Ser. No. 234,767
14 Claims. (Cl. 29—229)

This invention relates to improvements in tools for handling split retaining rings in their assembly and disassembly, and more particularly to an improved pliers-type hand tool for contracting and releasing (in the case of internal rings) and spreading and releasing (in the case of external rings) the larger sizes of such rings with relative ease and facility.

As is well known, split spring retaining rings are widely used to form artificial shoulders in the bores of housings (internal rings) and on shafts (external rings). To assemble such rings, the internal ring must be contracted from its normal unstressed diameter to an external diameter slightly less than that of the bore of the housing and then inserted in and guided axially along the bore to the plane of its seating groove, into which it is released. Conversely, the external ring must be expanded from its normal unstressed diameter to an internal diameter slightly exceeding the diameter of its shaft and then guided axially over and along the shaft end to the plane of its seating groove, in which when released it spring seats itself.

To enable the handling of such rings, i.e. contracting of the internal rings and spreading of the external rings and thereupon their guided movement into a bore or over the end of a shaft in or on which they are to be assembled, it is conventional to provide pliers-type hand tools having working points adapted to be inserted into apertures or the equivalent in the free ends of the ring bodies and which are closely sized to said working points. However, in the case of the larger-size rings, the operation of closing the plier handles and holding same closed during guidance of the ring to the plane of its groove is difficult and laborious because of the high initial resistance to contraction or spreading possessed by the larger-size rings, taken with the fact that this resistance increases with ring contraction and/or spreading from the normal unstressed condition.

Stated broadly, a major object of the present invention is the provision of a pliers-type tool constructed and arranged so as to be capable of handling, i.e. contracting or spreading and thereafter maintaining the so stressed condition as the ring is guided to its seating groove, the larger sizes of split spring retaining rings with substantially the same relative ease and facility as with the smaller sizes of such rings.

More particularly, the invention contemplates and provides a practical, effective and easily operated pliers-type hand tool for effecting such contraction and spreading of the internal and external rings, respectively, with a progressive, step-by-step closing movement of the handles of the pliers, and thereupon a release of the ring with a similar progressive, step-by-step opening movement of the pliers as prevents rebound of a ring likely to occur if it is released into its groove in a quick, uncontrolled manner.

A further object of the invention is the provision of a hand-operated pliers-type tool for handling split spring retaining rings, particularly those of the larger sizes, whose construction and arrangement of parts is such that the working tips or points thereof which engage in the apertures provided in the ends of the ring bodies move substantially parallel to each other, thereby overcoming the likelihood of one of the plier working points withdrawing from its ring aperture as can result in the tensioned ring disengaging and being hurled from the tool with substantial force and possibly inflicting damage to persons or machinery which can happen should the pliers working points move in inclined paths with respect to one another.

Still another important object of the invention is the provision of an improved pliers-type tool for handling split spring retaining rings of the larger sizes, characterized by a construction and design such that the tool can be held and operated by one hand, thus permitting the operator to employ his other hand usefully, for example in holding and adjusting the rings in correct position for their assembly as they are being contracted or spread.

Yet another object of the invention is the provision of an improved pliers-type tool for handling split spring retaining rings, particularly of the larger sizes, which is characterized by a substantially increased transmission ratio as compared to that possessed by conventional pliers, without at the same time requiring any substantial increase in length of the plier arms.

A more specific object of the invention is the provision of an improved pliers-type tool for handling split spring retaining rings of the larger sizes, which incorporates novel pawl and ratchet means for effecting both a step-by-step closing and opening movement of the plier handles, and thereby a step-by-step contracting and release of the internal retaining rings and a step-by-step spreading and release of the external rings.

The above and other objects and advantages of the improved pliers-type tool for handling split retaining rings as required in their assembly in housing bores or on shafts according to the present invention will appear from the following detailed description thereof, in which reference is had to the accompanying illustrative drawings, wherein—

FIG. 6 is a broken-away detail view illustrating the pivotally related ends of the lever arm shown in FIGS. 4 and 5 and of the rocker and pliers-operating arms assembled thereto, the parts being shown in their relative positions which they occupy at the start of the pliers closing movement;

FIG. 7 is a view similar to FIG. 6 but showing the position of the parts when the pliers is in the fully closed position;

FIG. 8 is a view similar to FIG. 7 but illustrating the position of said parts at the beginning of the pliers opening movement;

FIG. 9 is a view similar to FIG. 7 but illustrating the relationship of parts at the end of the pliers opening (ring releasing) movement, and further showing in broken lines the different positions assumed by one of the parts as aforesaid.

Figure 1:
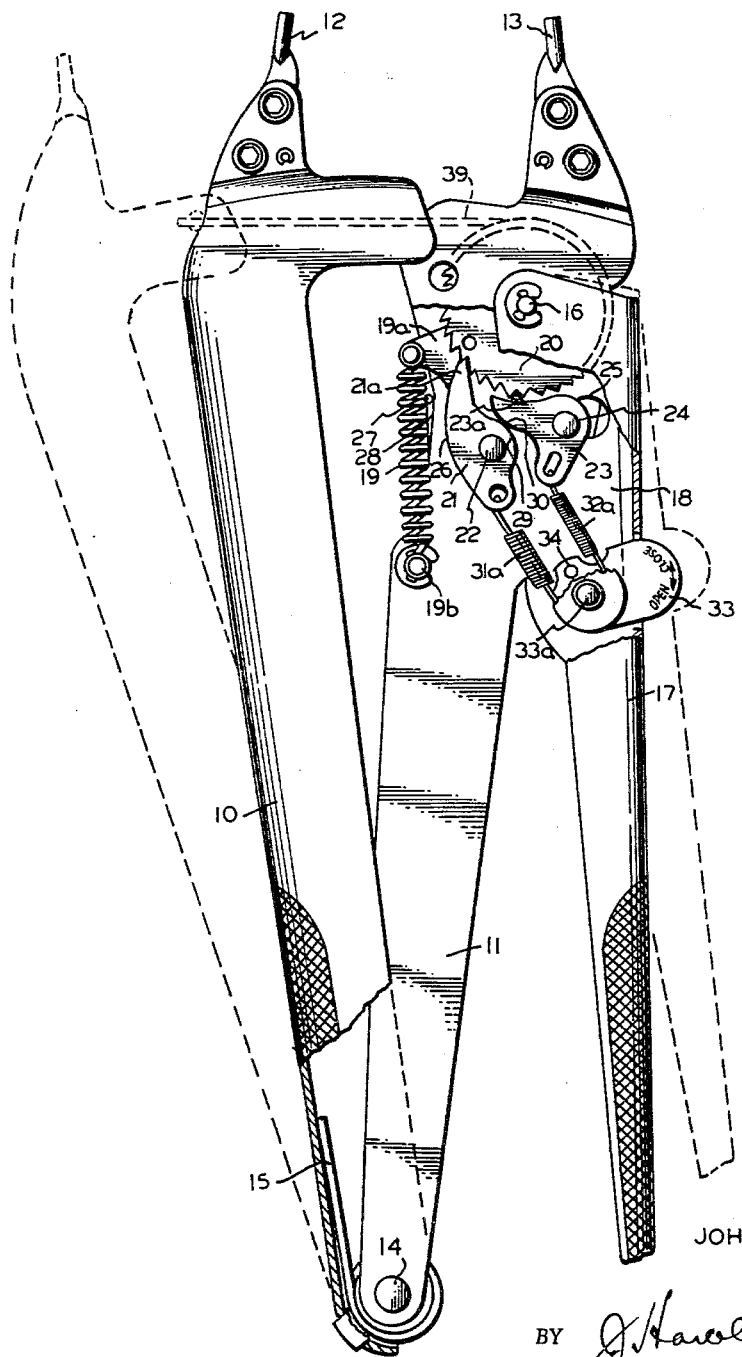
FIG. 1 is a side elevation, with parts broken away to show interior construction, of a pliers for handling the larger-size internal rings according to the invention, shown in partly open position in full lines and in fully open position in broken lines.

Referring to the drawings in greater detail, a pliers according to the invention is shown to comprise first and second elongated lever arms 10, 11, carrying pin-like working points 12, 13 at their working ends, which arms are pivotally connected to one another at their extreme opposite ends by means of a pivot pin 14. The working-point ends of said lever arms 10 and 11 are biased to a normal, spread-apart position by suitable means such as a spring 15 wrapped about said pivot pin whose ends are reactive against said arms.

Pivotally connected to the aforesaid second arm 11 by means of a cross-shaft 16 disposed a short distance rearwardly from its working point 13 is a third lever arm 17 which, when the arms 10, 11 and their working points 12, 13 are in their normal, fully spread position, extends generally parallel to the aforesaid first arm 10. Said arms 10 and 17 have oppositely concave U-section and their ends opposite the working-point end of the tool function as tool handles, and said lever arm 17 also functions as a tool-operating arm as will be hereinafter more fully explained. The ends of the cross shaft 16 are made fast to the side walls of said third lever arm 17 through which said shaft extends, and thus the cross shaft partakes of the angular motion of said lever arm.

Enclosed within the channel of the lever arm 17 is a rocker arm 18 through which the cross shaft 16 extends and is made fast, whereby said rocker arm also partakes of the angular motion of the lever arm 17. A coiled tension spring 19 having its opposite ends connected respectively to a relatively forwardly disposed and inwardly extending protrusion 19a of the rocker arm 18 and rearward point 19b on the second lever arm 11 tends to bias the forward ends of said rocker arm and said lever arm 17 toward the first arm 10, thereby normally to maintain the opposite or handle end of said lever arm 17 spread from the handle end of the said first arm 10.

Also fast on said cross shaft 16 so as to turn with the lever arm 17 is a ratchet wheel 20 whose teeth are adapted to be alternately meshingly engaged by the pointed nose 21a of a first pawl 21 pivotally connected to the rocker arm 18 by means of a pivot pin 22 and being thus turnable on an axis fixed with respect to said rocker arm, and by the similarly pointed nose 23a of a second pawl 23 pivotally connected to the second lever arm 11 by a pivot pin 24 (FIG. 4), which latter, referring to FIG. 6 for example, extends through an arcuate slot 25 provided therefor in said rocker arm. Thus, said pawl 23 is bodily movable a limited amount toward and away from the first pawl 21 in accordance with each cycle of closing and opening movement of said third lever arm 17 functioning as a pivoted handle.

Figures 2, 3:
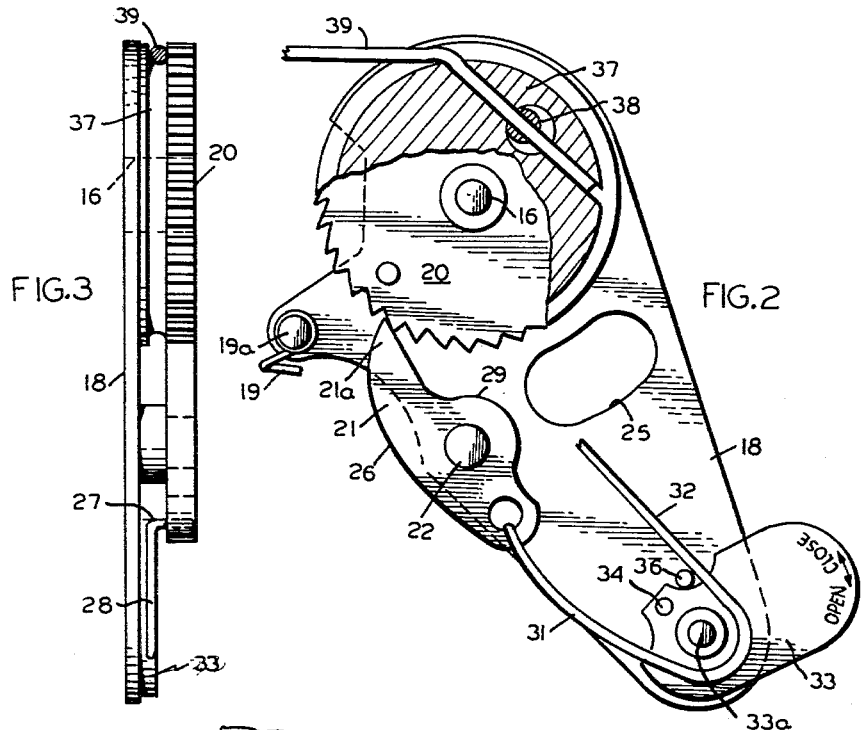
FIG. 2 is a detail view illustrating the rocker arm and related parts of the pawl and ratchet mechanism for effecting step-by-step movement of the pliers working points.
FIG. 3 is a side view of the rocker arm.

As is best seen in FIG. 2, said pawl 21 is provided with an outwardly curved, side-edge portion 26 which extends slightly beyond the edge of the rocker arm 18 carrying same and which by reference to FIG. 6 is adapted to coact with a sidewardly offset end 27 formed on one end of a stiff wire 28 whose other end is fixed to said second lever arm 11 at its aforesaid point 19b, said offset end being adapted to be abutted and biased by the aforesaid spring 19. Said pawl 21 also has a protruding cam portion 29 on its other side edge which is adapted to cooperate with a corresponding cam portion 30 formed on the adjacent side edge of the second pawl 23 when the parts are in their relative positions illustrated in FIGS. 1 and 8, for example.

The aforesaid pawls 21, 23 are adapted to be spring biased in opposite directions by spring means which may take the form of single coil springs 31a and 32a shown in FIG. 1, although preferably such means comprise the spaced arms 31 and 32 of a single U-shaped spring functioning as leaf springs, as shown in FIGS. 2, 6, 8 and 9. In either case, the direction of the bias exerted by said spring means on the pawls is controlled by means of a control "button" 33, actually a short-length lever having limiting swinging movement about the axis of a pivot pin 33a mounting same at a rearward point of the rocker arm 18. As best seen in FIG. 1, the free end of the control button 33 extends outwardly through the aforesaid third arm 17 and bears the readily viewable legends "Open" and "Close," which indicate the position in which the button is to be cocked for a desired pliers operation. To securely latch the control button 33 in either position to which it has been actuated, it is provided with latching means illustratively comprising a dimple 34 defining on its relatively under face a half-spherical embossment adapted alternately to seat in one of the complementally shaped recesses 35, 36 formed in the adjacent face of the rocker arm 18.

Fast on the cross shaft 16 immediately adjacent the ratchet wheel 20 there is provided a peripherally grooved wheel 37 which of course turns with said ratchet wheel; and anchored to a point on the periphery of said wheel 37, as by clamping means indicated at 38, is one end of a flexible connecting means 39, such as a chain or cable (hereinafter for convenience referred to as a "cable"), which extends and has its other end fastened to the aforesaid first pliers arm 10 at a point on the latter disposed a short distance rearwardly of its working point 12.

By reference to FIGS. 1 and 6 in particular, it now becomes apparent that with clockwise movement of ratchet wheel 20 and corresponding movement of the wheel 37 anchoring one end of the cable 39, the latter winds into the groove of said wheel and is thereby progressively shortened, as results in the pliers arms 10 and 11 and their working points 12 and 13 being forcibly drawn towards one another.

It is also notable that because the axis of the pivot pin 14 which connects the first and second lever arms 10 and 11 is substantially spaced from the working points 12 and 13, whereby even when said points are substantially spread said plier arms 10 and 11 are disposed at a relatively small angle to one another, the working points will move practically parallel to one another as they are drawn together as aforesaid, a feature which in large measure overcomes the possibility of the working points 12, 13 retracting from the holes in the ends of the split ring body of an internal ring being contracted, for example, as is likely to occur when the working points are substantially inclined to one another. Thus, the danger of a ring springing loose from the pliers as it is being contracted (or spread in case of the external rings) as may injure the operator or any machinery in the path of the hurling ring is substantially avoided.

Another feature of advantage of a pliers-type ring contracting and spreading tool according to the present invention is that because the mechanical transmission ratio, i.e. the radius of ratchet wheel 20 to the substantially full length of the lever arms 10 and 11 is relatively great, being approximately 10 to 1, the operation of the pliers will be effected with a minimum of closing force applied to the plier handles.

While it is believed that the operation of a pliers according to the invention will be clear to those skilled in the art, such is briefly summarized as follows: Let it be assumed that the working points 12 and 13 have been inserted in the holes or equivalent provided therefor in or at the ends of an internal split retaining ring of considerable size which is to be assembled in the bore of a housing and which thus must be contracted to an external diameter at least that of said bore against the substantial resistance to contraction inherent in such a ring. Accordingly, control button 33 is swung to the "Close" position in which it latches by movement of its embossment 34 into the recess 35 provided therefor in the rocker arm 18 as aforesaid. In this position of the control button 33 and the corresponding position of the pawl and ratchet parts illustrated in FIG. 6, the spring arms 31, 32 are swung to the limit of their counterclockwise movement, as results in the working or nose ends of the pawls 21 and 23 being resiliently urged towards the right, and thus towards or into engagement with the teeth of the ratchet wheel 20. It is to be observed that this has no effect on pawl 23 whose nose 23a had earlier fully moved into the space or notch between two adjacent ratchet teeth, thus functioning to arrest back or retrograde motion of the ratchet wheel 20. Also to be noted is that, since the force of spring 19 tending to turn the ratchet wheel in rearward direction, is far greater than the bias exerted on pawl 23 by the spring arm 32, said pawl is prevented from retracting from this position so that the ratchet wheel 20 is effectively held against any unwanted back motion. On the other hand, the nose 21a of pawl 21 has only partially entered the space or notch between the adjacent teeth of the ratchet wheel 20, but is of course in position and ready to complete its movement thereinto with closing movement of the plier handles.

When now the lever arms 10 and 17 are closed, i.e. their handle ends are moved towards one another, the nose of pawl 21 is initially actuated into fully seated position in said space or notch between the two teeth of the ratchet wheel into which it had previously only partially entered, and thereupon, i.e. during the final portion of such lever arm movement, it positively actuates said ratchet wheel 20 in clockwise direction an amount corresponding to the pitch distance between two adjacent teeth of said ratchet wheel. As the ratchet wheel makes its aforesaid step of rotation, the nose of pawl 23 is cammed out of the notch between the two adjacent teeth of the ratchet wheel in which it had engaged previously, but said nose immediately snaps back into the notch between the next two following teeth of said ratchet wheel under the bias of spring 32 which again becomes effective as hand pressure on the third arm (handle) 17 is released. Upon such release the plier arms return to their normal spread position under the bias of spring 19 plus that of the now partially contracted retaining ring, thus completing a cycle of pliers handle movement and an increment of motion of the pliers working points 12 and 13 towards one another by shortening of the cable 39.

The aforesaid cycle of pliers handle closing and opening movement is repeated as many times as may be necessary to effect the desired contraction of the ring to be assembled, during which operations and the time interval required for their performance the ring is securely held by the substantially parallelly disposed working points 12 and 13.

To effect controlled release of the contracted internal ring into its groove as prevents ring rebound and possibly improper seating thereof against the bottom of its seating grove as can occur when a contracted ring is suddenly released, it is only necessary to throw the control button 33 to its "Open" position shown in FIGS. 8 and 9 and thereupon to actuate the plier handles, i.e. the handle ends of the arms 10 and 17, as described above. In explanation, reversal of control button position results in the springs 31 and 32 being swung to the right or clockwise direction, as imparts to the pawls 21 and 23 the tendency to fall away and disengage from the teeth of the ratchet wheel 20. Indeed, the pawl 23 actually falls away from said ratchet wheel, as is indicated in FIG. 8, but only during the short interval that the nose 21a of the pawl 21 is held fully seated in a notch between two adjacent teeth of the ratchet wheel consequent to its outwardly curved side-edge portion 26 having been engaged by the offset end 27 of rod 28.

Figures 4, 5:
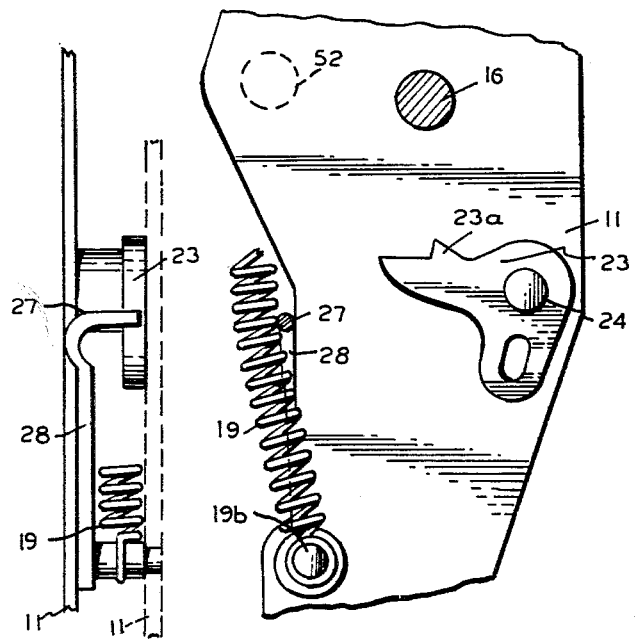
FIGS. 4 and 5 are views corresponding to FIGS. 2 and 3, illustrating a portion of one of the plier lever arms and a pawl of the pawl and ratchet mechanism which is carried thereby.

The action of the offset end 27 of said rod 28 in preventing uncontrolled falling-away movement of the pawl 21 from ratchet wheel 20 under the bias of the spring 31 and of thereupon returning said pawl to a position such that its working or nose end will enter the space or notch between the two following (clockwise disposed) teeth of the ratchet wheel, thereby to prevent uncontrolled back rotation of said ratchet wheel under the tension of the contracted ring with which the tool is engaged in the interval that the pawl 23 is inoperative, is generally illustrated in FIG. 9 wherein the broken-line positions of the pawl 21 (viewing same from right to left) show that after said pawl 21 has fallen away from the ratchet wheel 20 with each release of the lever arm 17, it will be first stopped, by its engagement with the offset end 27 of the rod 28 and then positively guided in a curved path to its ratchet-wheel holding position (in which it is shown in FIG. 8) responsive to each closing of said lever arm. Also it is to be understood from FIGS. 8 and 9 that as pawl 21 moves from right to left (to its FIG. 8 position) with closing of said lever arm 17, its inner-edge cam portion 29 will engage cam portion 30 of pawl 23 (after the latter has released the ratchet wheel for limited turning movement, i.e. twice the pitch distance between two ratchet teeth) and thereby force said pawl back to its ratchet-wheel holding position in which it is shown in FIG. 4.

Thus, as analysis of FIGS. 8 and 9 will show, successive closing operations of the handles 10 and 17 of the tool will result in a progressive, step-by-step, controlled separation of the working points 12, 13 against the diminishing resistance of the retaining ring engaged by said working points. However, in opening of the pliers, pawl 21 (and this is true also for pawl 23) requires double the time to return to its ratchet-wheel holding or stopping position than is required by said pawls when the working points 12 and 13 are being brought together to effect ring contraction. That is to say, both pawls 21 and 23 skip or jump one ratchet tooth with each closing or pumping of the operating arm 17, but it will be understood that such is completely without prejudice to a secure, controlled spreading of the working points 12, 13.

Figure 10:
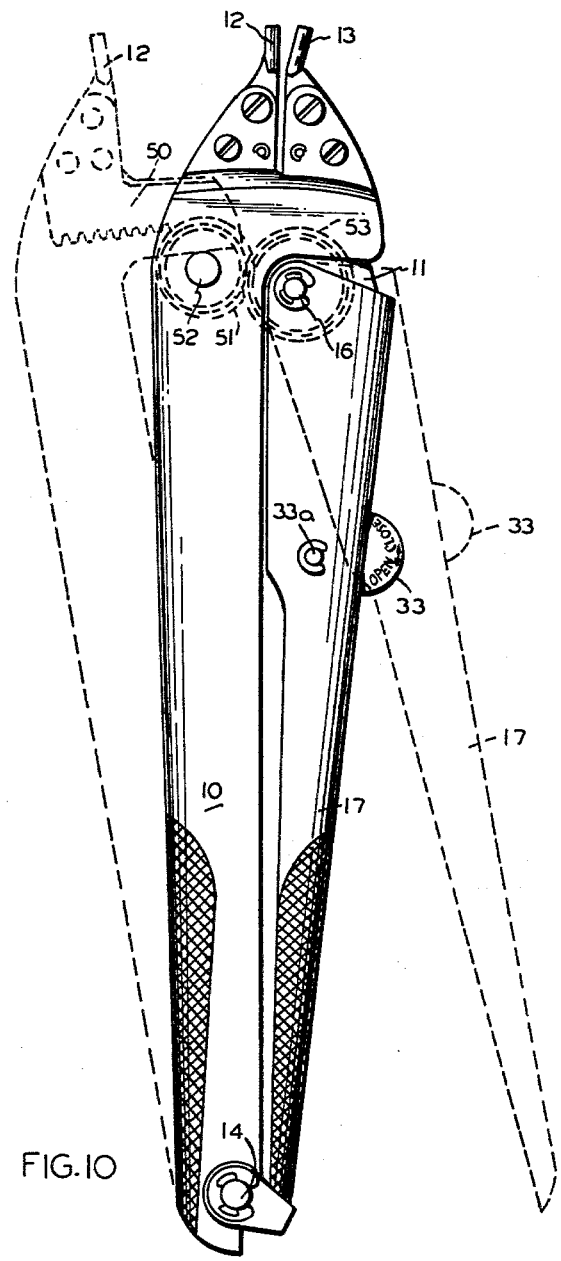
FIG. 10 is a side elevation of the pliers according to the invention adapted for use in spreading and thereafter releasing external split retaining rings.

Referring to FIG. 10, such illustrates the basic pliers of the present invention adapted or converted to external pliers used to spread external split rings to an internal diameter slightly greater than that of the shafts on which said rings are to be assembled and thereupon to release such rings into their shaft grooves, both with a controlled, step-by-step motion of the pliers working points. Here it is explained that the invention contemplates the simple conversion of the internal pliers according to FIGS. 1–9 to an external-ring pliers merely by substituting a rack bar 50 for the cable or chain 39 thereof and by mounting on the lever arm 11 an idler pinion 51 turning on a cross pin 52 disposed adjacent the aforesaid cross shaft 16 and by further mounting on the cross shaft 16, in substitution of the peripherally grooved wheel 37, a driving pinion 53 which meshes with said idler pinion 51 and thereby transmits step-by-step motion to said rack bar corresponding to the step-by-step rotation of the ratchet wheel 20. Otherwise the design and operation of the external pliers is the same as that described for the internal pliers, with the exception, of course, that the external pliers operate from an initial or starting position in which the working points are disposed close to one another and said points are spread apart with a progressive step-by-step motion, as distinguished from the internal pliers which start with the working points in a spread-apart position and effect closing movement thereof with the progressive step-by-step motion.

Without further analysis, it will be seen that a pliers-type tool for handling the large sizes of split spring retaining rings as described in the foregoing achieves the objectives of such a tool as previously set forth in able, effective and thoroughly dependable manner. However, as many changes could be made in carrying out the above constructions without departing from the scope of the invention, it is intended that all matter contained in the above description or shown in the accompanying drawings shall be interpreted as illustrative and not in a limiting sense.

I claim:

1. A pliers-type tool for handling split spring retaining rings requiring radial deformation in their assembly and disassembly comprising, in combination, first and second elongated lever arms having corresponding tip ends terminating in working points and being pivotally connected to one another at their extreme opposite ends, means operatively connected to and extending between said arms adjacent their tip ends for imparting relative angular motion to said arms and thereby their working points against the spring tension of a ring to which the working points are coupled developing both during deformation of and while releasing said ring, a third lever arm pivotally connected to said second lever arm for angular motion with respect thereto, and thereby to said first arm about an axis disposed adjacent the tip end of said second arm, means biasing said first, second and third arms to normal angular positions with respect to one another wherein said working points are normally positioned a predetermined distance from one another and said third arm extends in a substantial parallelism with said first arm, the pivoted end of said first arm and the corresponding free end of said third arm being shaped as handles adapted for opening and closing movement with respect to one another, pawl and ratchet means operatively mounted on said second arm adjacent its tip end for actuating said motion-impartnig means and thereby said working tips with a step-by-step motion, means interrelating the motion of said third arm with that of said pawl and ratchet means in such manner that a succession of closing and opening movements of the handle ends of the first and third arms effects actuation of said pawl and ratchet means and thereby step-by-step motion of said working points as aforesaid in one or the opposite direction, and means carried by one of said arms for selectively determining the direction of relative step-by-step angular motion imparted to said working points with respect to one another as aforesaid.

2. A pliers-type tool according to claim 1, wherein said pawl and ratchet means includes a ratchet wheel and a pair of pawls alternately engageable therewith in accordance with the direction of motion of said handle ends with respect to one another for intermittently turning said ratchet wheel in positive manner and thereupon preventing its retrograde movement under the aforesaid spring tension of said ring.

3. A pliers-type tool according to claim 1, wherein said motion-imparting means comprises a cable whose effective length is varied in accordance with turning motion imparted to the ratchet wheel.

4. A pliers-type tool according to claim 1, wherein said motion-imparting means comprises a rack bar having a gear-tooth connection with said ratchet wheel whereby its effective length is varied in accordance with turning motion imparted to the ratchet wheel.

5. A pliers-type tool according to claim 2, wherein the means for selectively determining the direction of angular motion imparted to said working points includes means for selectively reversing the action of said pawls with respect to said ratchet wheel, whereby opening and closing motion of the handle ends of the first and third lever arms effects either spreading or contraction motion of the working points as desired.

6. A pliers-type tool according to claim 2, wherein said pawls are pivotally connected to said second and third lever arms respectively both for turning movement and for independent bodily movement therewith.

7. A pliers-type tool according to claim 6, wherein said pawls are biased to turn in unison in either clockwise or counter-clockwise direction and wherein said means for selectively determining the direction of angular motion imparted to said working points includes a manually movable control member carried by said third lever arm and being mounted for movement from one to the other of two predetermined positions, and means whereby the position of said control member determines the action of said handle ends in contracting or spreading the working points.

8. A pliers-type tool according to claim 7, wherein said pawls are disposed in juxtaposition and are provided with edge-abutting portions which cooperate with one another in maintaining one of said pawls in driving relation with respect to said ratchet wheel when said control member is moved to one of its positions as aforesaid.

9. A pliers-type tool for handling split spring retaining rings requiring radial deformation in their assembly and disassembly comprising, in combination, first and second elongated lever arms having corresponding tip ends terminating in working points and being pivotally connected to one another at their extreme opposite ends, means operatively connected to and extending between said arms adjacent their tip ends for imparting relative angular motion to said arms and thereby to their working points against the spring tension of a ring to which the working points are coupled developing both during deformation of and while releasing said ring, pawl and ratchet means operatively associated with and in part mounted on said second arm and turnable about an axis disposed adjacent its tip end for actuating said last means with a step-by-step motion, and a third lever arm pivotally connected to said second lever arm for angular motion about said axis toward and away from said first lever arm from a normal position in substantial parallelism with said first lever arm, the pivoted end of said first arm and the free end of said third arm being shaped as tool handles, and means interconnecting said third arm, said pawl and ratchet means and said motion-imparting means in such manner that a succession of handle opening and closing movements effects actuation of said pawl and ratchet means and thereby a step-by-step actuation of said working points in opposite direction as to effect both the required radial deformation of said ring and thereupon a controlled release of said ring, said pawl and ratchet means including a cross shaft having bearing in said second lever arm and to which the third arm is rigidly affixed and which provides the pivotal connection of said third arm with said second arm, said cross shaft having fast thereon a ratchet wheel, a rocker arm and means for transmitting turning motion of said shaft to the aforesaid means connected to and extending between the first and second lever arms adjacent their tip ends, and a pair of pawls engageable with the teeth of the ratchet wheel for alternately imparting an increment of motion to said ratchet wheel and thereupon securing said wheel against retrograde motion responsive to each cycle of closing and opening movements of said handles, one of said pawls being pivotally mounted on said rocker arm and the other of said pawls being pivotally mounted on said second lever arm.

10. A pliers-type tool according to claim 9, wherein said pawls are disposed in side-by-side relation and are biased to either of their clockwise or counter-clockwise positions by spring means effective thereon, and a manual control means is provided for controlling the direction of the bias exerted on said pawls by said spring means.

11. A pliers-type tool according to claim 10, wherein in their counter-clockwise positions the pawls tend cylically to move out of engagement with the ratchet wheel, and wherein cam means mounted on said second lever arm and on the pawls themselves are provided which actuate said pawls alternately into engagement with the ratchet wheel at predetermined points within their cycle of motion corresponding to that of handle movement as aforesaid.

12. A pliers-type tool according to claim 9, wherein said third lever arm has U-section and the tip end of said second arm, said rocker arm and said pawl and ratchet means are at least partially housed within the channel of said section.

13. A pliers-type tool according to claim 9, wherein said motion-imparting comprises a rack bar and said motion-transmitting means comprises at least one pinion with which said rack bar meshes.

14. A pliers-type tool for handling split spring retaining rings requiring radial deformation in their assembly and disassembly comprising, in combination, first and second elongated lever arms having corresponding tip ends terminating in working points and being pivotally connected to one another at their extreme opposite ends, means operatively connected to and extending between said arms adjacent their tip ends for imparting relative angular motion to said arms and thereby to their working points against the spring tension of a ring to which the working points are coupled developing both during deformation of and while releasing said ring, pawl and ratchet means operatively associated with and in part mounted on said second arm and turnable about an axis disposed adjacent its tip end for actuating said last means with a step-by-step motion, and a third lever arm pivotally connected to said second lever arm for angular motion about said axis toward and away from said first lever arm from a normal position in substantial parallelism with said first lever arm, the pivoted end of said first arm and the free end of said third arm being shaped as tool handles, and means interconnecting said third arm, said pawl and ratchet means and said motion imparting means in such manner that a succession of handle opening and closing movement effects actuation of said pawl and ratchet means and thereby a step-by-step actuation of said working points in directions as to effect both the required radial deformation of said ring and thereupon a controlled release of said ring, said means connected to and extending between said first and second lever arms adjacent their tip ends comprising a rack bar.

References Cited by the Examiner

UNITED STATES PATENTS

| | | | |
|---|---|---|---|
| 1,616,621 | 2/27 | Hooks | 81—314 X |
| 2,439,785 | 4/48 | Feitl et al. | 29—229 |
| 2,643,564 | 6/53 | Klein et al. | 81—314 |
| 3,084,432 | 4/63 | Hill | 81—314 X |

FOREIGN PATENTS 887,029   8/53   Germany.

WILLIAM FELDMAN, *Primary Examiner.*
MILTON S. MEHR, *Examiner.*